July 12, 1927.
J. J. HOFFMANN
1,635,844
HOPPER FOR MOLDS
Filed April 13 1926
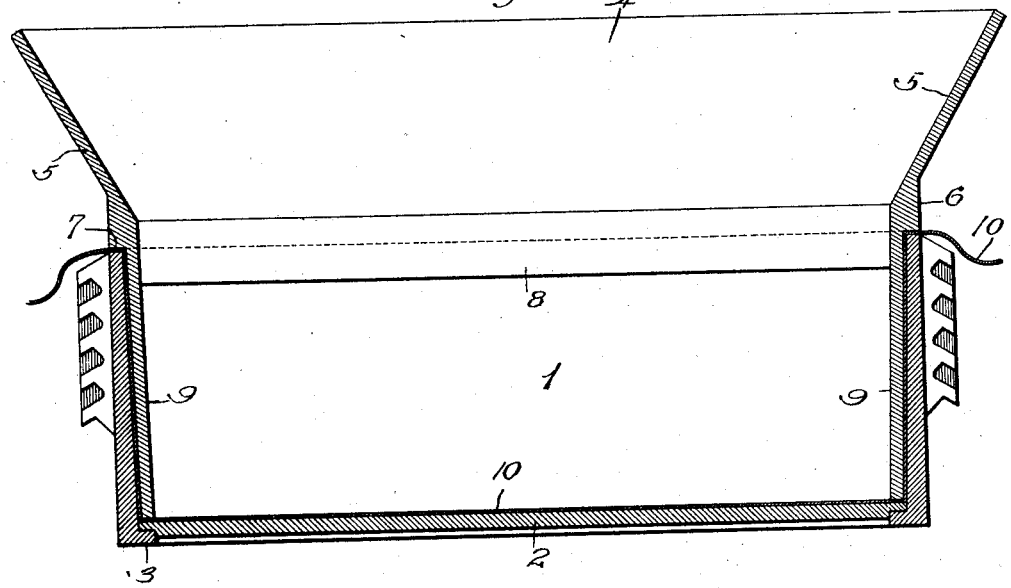
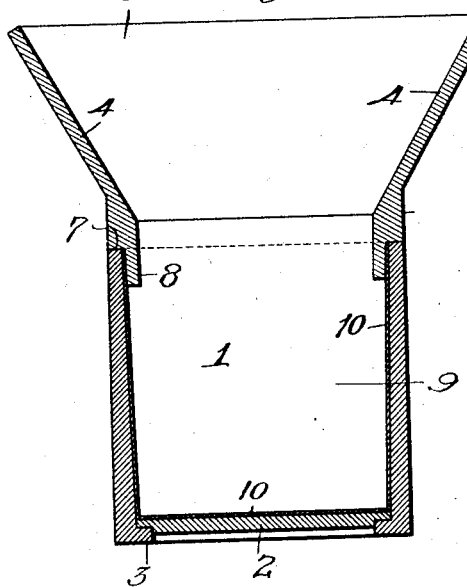
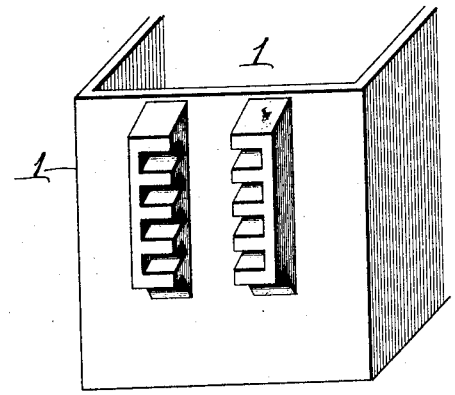
Inventor:
Joseph J. Hoffmann.
By H. S. Bailey, Attorney.

Patented July 12, 1927.

1,635,844

UNITED STATES PATENT OFFICE.

JOSEPH J. HOFFMANN, OF DENVER, COLORADO.

HOPPER FOR MOLDS.

Application filed April 13, 1926. Serial No. 101,710.

My invention relates to improvements in hoppers for molds.

The object of the invention is to provide a hopper which is adapted to receive thereon a bag, and to facilitate the insertion of the said bag into a mold, to receive material which is passed through the hopper.

Further, to provide a hopper of this character, having portions of a length corresponding to the depth of the mold, thereby to receive and seat a bag placed thereon against the bottom of the mold.

These objects are accomplished by the device illustrated in the accompanying drawings, in which:

Figure 1, is a vertical longitudinal sectional view through a mold, illustrating the application of the improved hopper.

Figure 2, is a transverse sectional view of the mold and hopper shown in Figure 1, and Figure 3, is a perspective view of one end portion of a mold.

Referring to the accompanying drawings:—

The numeral 1, designates a rectangular mold having integral sides and ends and a removable bottom 2, which rests upon a narrow ledge 3, formed upon the sides and ends of the mold at the lower edges thereof.

The particular construction of the mold forms no part of the present invention, however, and while the mold shown is particularly adapted for the pressing of meats and other food articles, it will be understood that the improved hopper may be used in connection with any character of rectangular mold or receptacle.

In connection with molds for pressing meats into loaf form, it is preferable to place within the mold, a fabric bag or sack, in order that the pressed and cooked product may be removed from the mold intact, and may be handled without danger of breakage.

The improved hopper is adapted to be placed within a sack of this character, and to facilitate the insertion of the sack into the hopper, so that the sack may contact with the sides, ends and bottom of the hopper. To this end, I provide a hopper comprising outwardly flared side and end walls 4 and 5, respectively, which terminate in a narrow band portion 6, forming a surrounding shoulder 7, which is adapted to rest upon the edge or rim of the mold to be filled, as shown in the drawings, and the sides of the band portion 6 are formed with narrow depending strips 8, while the ends of said band portion are formed with depending plates 9 of a length corresponding to the depth of the mold. A bag or sack 10 is placed around the side strips 8 and end plates 9, and thus can be easily inserted in the mold, as will be understood by reference to the drawings.

The end plates 9 can be easily and quickly inserted in a bag, and will shape the bag for easy insertion in a mold, and the narrow side strips 8, will enter the mouth of the bag and confine the side portions of the mouth of the bag between the said strips and the sides of the mold, thus permitting uninterrupted passage of material through the hopper and into the mold.

The end plates press the bottom of the bag against the bottom of the mold, making it unnecessary to extend the side strips to the bottom of the mold.

This arrangement not only effects a saving of material, but enables the hopper to be more easily inserted in the mold than would be the case if the side strips and end plates were of equal length.

Having described my invention, what I claim as new and desire to secure by Letters Patent, is:—

1. A hopper for molds having a surrounding shoulder adapted to rest upon the rim of the mold, depending side strips adapted to extend a slight distance into the mold and depending end plates adapted to extend to the bottom of the mold, said side strips and end plates being adapted to be inserted in a bag, thereby to facilitate the insertion of the bag in the mold.

2. A hopper for molds comprising a flared mouth portion having a surrounding shoulder at its lower end adapted to rest upon the rim of the mold, depending end plates of the width of the mold and of a length corresponding to the depth of the mold, and depending side members which extend a slight distance into the mold, said members being adapted to be inserted in a bag, thereby to facilitate the insertion of the bag into the mold, said side members holding the sides of the mouth portion of the bag in contact with the side walls of the mold.

In testimony whereof I affix my signature.

JOSEPH J. HOFFMANN.